United States Patent
Dua (10) Patent No.: US 8,943,057 B2
(45) Date of Patent: Jan. 27, 2015

(54) METHOD AND SYSTEM FOR DISTRIBUTED BULK MATCHING AND LOADING

(75) Inventor: Swaranjit Singh Dua, Arcadia, CA (US)

(73) Assignee: Oracle America, Inc., Redwood Shores, CA (US)

(*) Notice: Subject to any disclaimer, the term of this patent is extended or adjusted under 35 U.S.C. 154(b) by 1864 days.

(21) Appl. No.: 11/955,219

(22) Filed: Dec. 12, 2007

(65) Prior Publication Data

US 2009/0157592 A1 Jun. 18, 2009

(51) Int. Cl.
*G06F 17/30* (2006.01)

(52) U.S. Cl.
CPC .... *G06F 17/30595* (2013.01); *G06F 17/30495* (2013.01)
USPC ............ 707/737; 707/718; 707/752; 707/770

(58) Field of Classification Search
CPC ..................... G06F 17/30595; G06F 17/30495
USPC .......... 707/1, 3, 6, 7, 100, 104.1, 8, 705, 722, 707/748, 749, 770, 737, 718, 752
See application file for complete search history.

(56) References Cited

U.S. PATENT DOCUMENTS

| | | | |
|---|---|---|---|
| 6,816,854 B2 * | 11/2004 | Reiner et al. | 707/770 |
| 7,324,447 B1 * | 1/2008 | Morford | 370/231 |
| 7,325,013 B2 * | 1/2008 | Caruso | 707/999.104 |
| 7,392,248 B2 * | 6/2008 | Bakalash et al. | 707/5 |
| 7,403,136 B2 * | 7/2008 | De La Cruz et al. | 341/51 |
| 7,406,477 B2 * | 7/2008 | Farrar et al. | 707/999.003 |
| 7,469,241 B2 * | 12/2008 | Bellamkonda et al. | 707/2 |
| 7,546,294 B2 * | 6/2009 | Hullender et al. | 707/999.006 |
| 7,650,331 B1 * | 1/2010 | Dean et al. | 712/203 |
| 2002/0099691 A1 * | 7/2002 | Lore et al. | 707/2 |
| 2004/0078364 A1 * | 4/2004 | Ripley et al. | 707/3 |
| 2007/0282827 A1 * | 12/2007 | Levin | 707/5 |

* cited by examiner

*Primary Examiner* — Fred I Ehichioya
*Assistant Examiner* — Dangelino Gortayo
(74) *Attorney, Agent, or Firm* — Osha Liang LLP (57) ABSTRACT

A method for matching bulk data, involving receiving a plurality of input records, performing block distribution on the plurality of input records to obtain a plurality of block records, wherein performing block distribution comprises distributing the plurality of input records to a first plurality of containers, performing concurrent matching operations on the plurality of block records to obtain a plurality of single best records, and loading the plurality of single best records into a master index database.

17 Claims, 4 Drawing Sheets

METHOD AND SYSTEM FOR DISTRIBUTED BULK MATCHING AND LOADING

BACKGROUND

Currently, many different types of software applications provide record matching for records stored in a relational database or other types of storage mediums. Such record matching capabilities are typically useful, for example, for businesses that provide services to customers and need to keep track of information, such as customer personal information, purchase price, quantity purchased, etc. Record matching may have several uses. For example, by performing record matching, records that contain incomplete data can be completed using information from a matching record which includes the missing data. Further, matching records can be aggregated into a single profile to store information more efficiently. To perform recording matching, a framework is typically provided by a business or service entity to create and maintain matching and indexing applications, known as master indices.

Matching applications typically use probabilistic matching algorithms to match and link data. Using such probabilistic algorithms, determining whether two records match requires computing match weights of some designated match fields in a record and adding weights for all such fields. The weights are then compared with a designated match threshold weight to determine whether the records belong to the same overall profile. For example, suppose the user-defined match threshold weight is 40, and the following record pair is matched:
Record1: John Smith Jan. 1, 2007 Los Angles Calif.
Record1: Joe Smit Jan. 1, 2007 Los Angeles Calif.
If the match weight computed by a match engine is greater than or equal to a match weight of 40, then the above two records are classified as a match pair. Alternatively, if the match weight computed for the above two records is below a match weight of 40, then the records are classified as a non-match pair.

Another method for matching records in larger relational databases uses block record matching. A block is typically defined as a set of records that have one or more fields in common, such as "SSN" or "firstName AND lastName." With block record matching, based on the input record received by the relational database, a list of records with one or more combinations of common field values is fetched. Thus, a block of records is created, which reduces the number of record pairs that need to be matched with one another. Each record from the block of records can then be sent to the matching engine, where the matching engine compares multiple field values from each record pair in the block of records to determine whether a match to the input record exists.

With either block record matching or individual record matching, typically, each time an input record (i.e., a new record) is received by the database or storage medium, a database query is issued to match the new input record to one or more stored records in the database. As database size grows exponentially, this can cause delays in matching a growing number of input records.

SUMMARY

In general, in one aspect, the invention relates to a method for matching bulk data, comprising receiving a plurality of input records, performing block distribution on the plurality of input records to obtain a plurality of block records, wherein performing block distribution comprises distributing the plurality of input records to a first plurality of containers, performing concurrent matching operations on the plurality of block records to obtain a plurality of single best records, and loading the plurality of single best records into a master index database.

In general, in one aspect, the invention relates to a system for matching bulk data, comprising a master computing device configured to receive a plurality of input records, and perform block distribution on the plurality of input records to obtain a plurality of block records, wherein performing block distribution comprises distributing the plurality of input records to a first plurality of containers, a plurality of slave computing devices configured to execute concurrently to match the plurality of block records to obtain a plurality of single best records, and a master index database configured to store the plurality of single best records.

In general, in one aspect, the invention relates to a computer readable medium comprising instructions for matching bulk data, the instructions comprising functionality to receive a plurality of input records, perform block distribution on the plurality of input records to obtain a plurality of block records, wherein performing block distribution comprises distributing the plurality of input records to a first plurality of containers, perform concurrent matching operations on the plurality of block records to obtain a plurality of single best records, and load the plurality of single best records into a master index database.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for bulk distribution matching and loading. More specifically, embodiments of the invention relate to a distributed architecture for multiple computing devices to work in parallel to match data. Further, embodiments of the invention use hash buckets to form groups of data to be matched by distributed computing devices.

Figure 1:
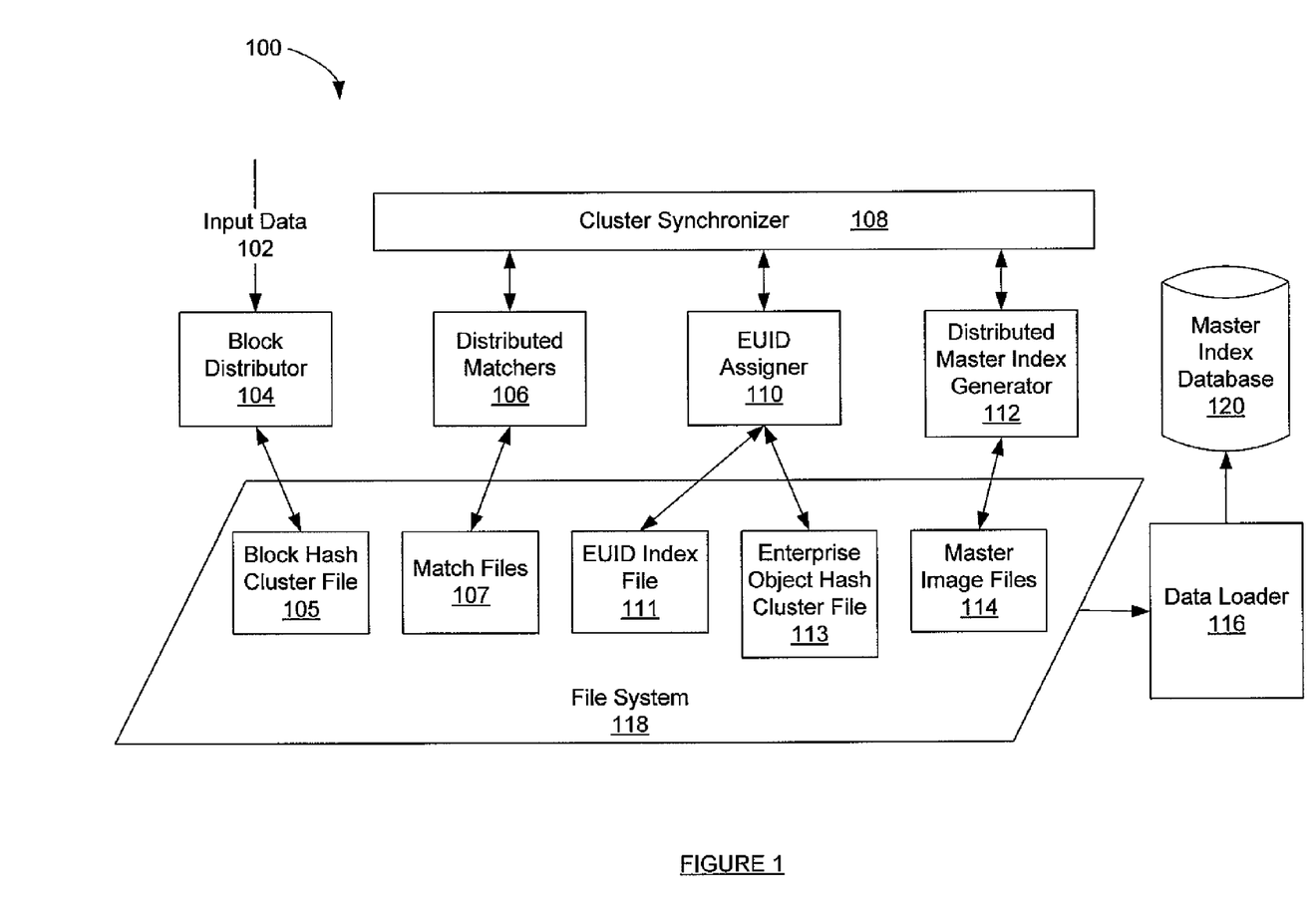
FIG. 1 shows a system architecture for bulk matching and loading in accordance with one or more embodiments of the invention.

FIG. 1 shows a distributed bulk matcher and loader (100) in accordance with one or more embodiments of the invention. Specifically, FIG. 1 includes a block distributor (104), distributed matchers (106), a cluster synchronizer (108), an enterprise unique identifier (EUID) Assigner (110), a distributed master index generator (112), a file system (118) including various types of data, a data loader (116), and a master index database (120). Each of the aforementioned components of the distributed bulk matcher and loader (100) are described in detail below.

In one or more embodiments of the invention, the distributed bulk matcher and loader (100) is a master computing device (i.e., a master loader) that uses a distributed architecture including several slave computing devices as shown in FIG. 1. Those skilled in the art will appreciate that some tasks may be performed by the master loader, while other tasks may be performed by slave loaders in parallel. Further, there may be any number of slave computing devices included in the distributed architecture. In one or more embodiments of the invention, the slave computing devices may be multiple threads executing on a single computing device and/or may include multiple computing devices. Further, each computing device may include single-core or multi-core processors.

The block distributor (104) is a master task that is executed by the master loader. In one or more embodiments of the invention, the block distributor (104) is configured to receive input data (102). In one or more embodiments of the invention, input data (102) may be spread across multiple systems and obtained from one or more sources. For example, input data (102) may be records obtained from one or more customer databases, file systems, persistent storage, or any other type of storage medium on which records are stored.

Each record is a hierarchical structure. Further, in one or more embodiments of the invention, each field in each record may be separated by delimiters. Those skilled in the art will appreciate that a record may be structured in any suitable manner, and the aforementioned description of the structure and form of a record is not meant to limit the scope of the invention in any way. Further, records may include any type of data. For example, records may include product information, customer personal information (e.g., names, addresses, phone numbers, social security numbers (SSNs), sex, date of birth, martial status, etc.), financial data, or any other type of data that may be duplicated across multiple records.

In one or more embodiments of the invention, the block distributor (104) is responsible for distributing input data (102) (i.e., input records) into containers. More specifically, in one or more embodiments of the invention, the input data is distributed by hashing input data into one or more buckets. A bucket is a persistent container (i.e., a persisted hash table) that may include one or more blocks of input data. Each block of input data includes data that has a block definition in common. A block definition is constructed by specifying one or more data fields that each record that is included in a block should contain. For example, a block definition may be all records with first name "John" and last name "Smith." Thus, a block of data may include all data from records that have one or more common data fields.

In one or more embodiments of the invention, the block distributor (104) is configured to apply a hash algorithm to obtain a hash value that corresponds to a bucket. The block distributor (104) then stores the data defined by the block definition that is hashed into the corresponding bucket. Those skilled in the art will appreciate that each bucket may include data of more than one block, depending on the hash value obtained when a particular data field is hashed to obtain a bucket number or bucket ID. For example, if the hash of record "JohnSmith" MOD N (where N is the number of buckets) equals 3, then all "JohnSmith" records are stored in bucket 3. Similarly, it is possible that the hash value of "JoeSnow" records also equals 3, in which case all "JoeSnow" records are also stored in bucket 3. Further, those skilled in the art will appreciate that the block distributor (104) distributes records into hash buckets using hash algorithms that are well known in the art.

Embodiments of the invention use a file system (118) for intermediate storage of data that is distributed into buckets, matched, or otherwise manipulated by the master or slave computing devices. Thus, the block distributor (104) stores the buckets including one or more blocks of data into a block hash cluster file (105) in the file system (118). Those skilled in the art will appreciate that the file system may be any type of suitable file system, such as, a database file system, a disk file system (e.g., NTFS, FAT, ZFS, etc.), a transactional file system, a network file system, etc.

Continuing with FIG. 1, the distributed matchers (106) are concurrently executed by multiple slave computing devices. Each distributed matcher (106) is configured to match the blocks of data stored in each bucket. More specifically, each distributed matcher (106) is configured to use probabilistic matching methods to generate and assign match weights to each pair of input records within a block of records. Each distributed matcher (106) begins processing one bucket at a time, until all the buckets have been matched. The distributed matchers (106) are also configured to output the matched data to one or more match files (107) stored in the file system (118). In one or more embodiments of the invention, each match file (107) includes a mapping of the global identifiers (GIDs) of the records that are deemed to be matched based on a comparison of the match weight assigned to each record pair and the match threshold weight. For example, entries in each match file (107) may be stored as follows:

| GIDFrom | GIDTo | weight |
|---------|-------|--------| where the GIDFrom represents a record from which record data was matched to the GIDTo record, and the weight is the match weight assigned to the matched pair of records based on the number of match fields that each record in the matched record pair have in common, and the quality of the data in each match field of each record.

The cluster synchronizer (108) is configured to ensure coordination among both the master bulk matcher and loader (100) and the various distributed, slave computing devices. In one or more embodiments of the invention, each concurrent computing device works on the same task at the same time, and does not move onto the next task until all the concurrent computing devices have completed the current task. To facilitate such coordination, the cluster synchronizer (108) stores relevant information regarding how many hash buckets exist and the state information of each hash bucket (i.e., new, EUID assigned, done, etc.). Further, the cluster synchronizer (108) is notified when each task is begun and completed by the component(s) that is/are responsible for performing each task. In one or more embodiments of the invention, the cluster synchronizer (108) is an in-memory Java object that is invoked by other components such as the block distributor (104) or the distributed matcher(s) (106) when each component's task is completed or when additional data is needed to perform one or more tasks. The cluster synchronizer (108) may store the aforementioned relevant information in any type of data structure, such as a database table, an array, a link list, or any other type of data structure.

The EUID Assigner (110) is a master task that is handled by the distributed bulk matcher and loader (100). The EUID Assigner (110) is configured to assign an EUID to each matching record pair that is linked in the match files (107).

More specifically, the EUID Assigner (110) obtains match files (107) from the cluster synchronizer (108) and merges the match files (107) into one large match file (not shown). Using the merged match file, the EUID Assigner (110) assigns the same EUID to records that match either directly or indirectly. For example, suppose records 1 and 8 are a matching record pair, and records 3 and 8 are also a matching record pair stored in the match files (107). In this case, the same EUID is assigned by the EUID Assigner (110) to records 1, 3, and 8. In one or more embodiments of the invention, the EUID Assigner (110) is also configured to create and store an EUID index file (111), which includes a mapping of the EUIDs for each record GID. The EUID index file (111) is also stored in the file system (118) and used as a random access file.

Further, in one or more embodiments of the invention, the EUID Assigner is also responsible for distributing input records into EUID bucket files. More specifically, the EUID Assigner (110) is configured to assign EUIDs to input records that belong to the same overall profile using the EUID index file and the merged match file described above. To allocate input records to a particular EUID bucket, a hash function is applied to the EUID assigned to each GID. Thus, records with the same EUID are assigned to the same EUID bucket. Those skilled in the art will appreciate that more than one EUID can hash to the same EUID bucket. The EUID buckets are stored in the enterprise object hash cluster file (113) in the file system (118).

The distributed master index generator (112) is a distributed task that may be performed by one or more distributed slave computing devices working in parallel. The distributed master index generator (112) is responsible for generating master image files (114) for storage into the master index database (120). More specifically, the distributed master index generator (112) obtains each EUID bucket from the cluster synchronizer (108), and creates a single best record (SBR) by merging/combining all the records with the same EUID. In one or more embodiments of the invention, the SBR is the most complete record corresponding to the same record profile. The distributed master index generator (112) is also configured to store the SBR for each set of records with the same EUID into the master image files (114). The master image files are flat transaction files capable of being loaded into the master index database (120). Those skilled in the art will appreciate that master image files (114) may include more than just the SBR for each group of records with a common EUID. For example, in one or more embodiments of the invention, the master image files may include all the input records, the SBR, and the EUIDs for each input record.

The data loader (116) loads the matched bulk data from the master image files (114) into the master index database (120). In one or more embodiments of the invention, the data loader (116) is a database bulk loading tool. However, embodiments of the invention are not limited to using a vendor database bulk loader, and may be performed using other types of loaders, such as a Java Database Connectivity (JDBC) loader or any other type of suitable loader. In one or more embodiments of the invention, the data loader (116) loads the master image file data into an empty master index database (120). That is, the master index database (120) is loaded with matched record data that is being matched by the data loader (116) for the first time.

Figure 2:
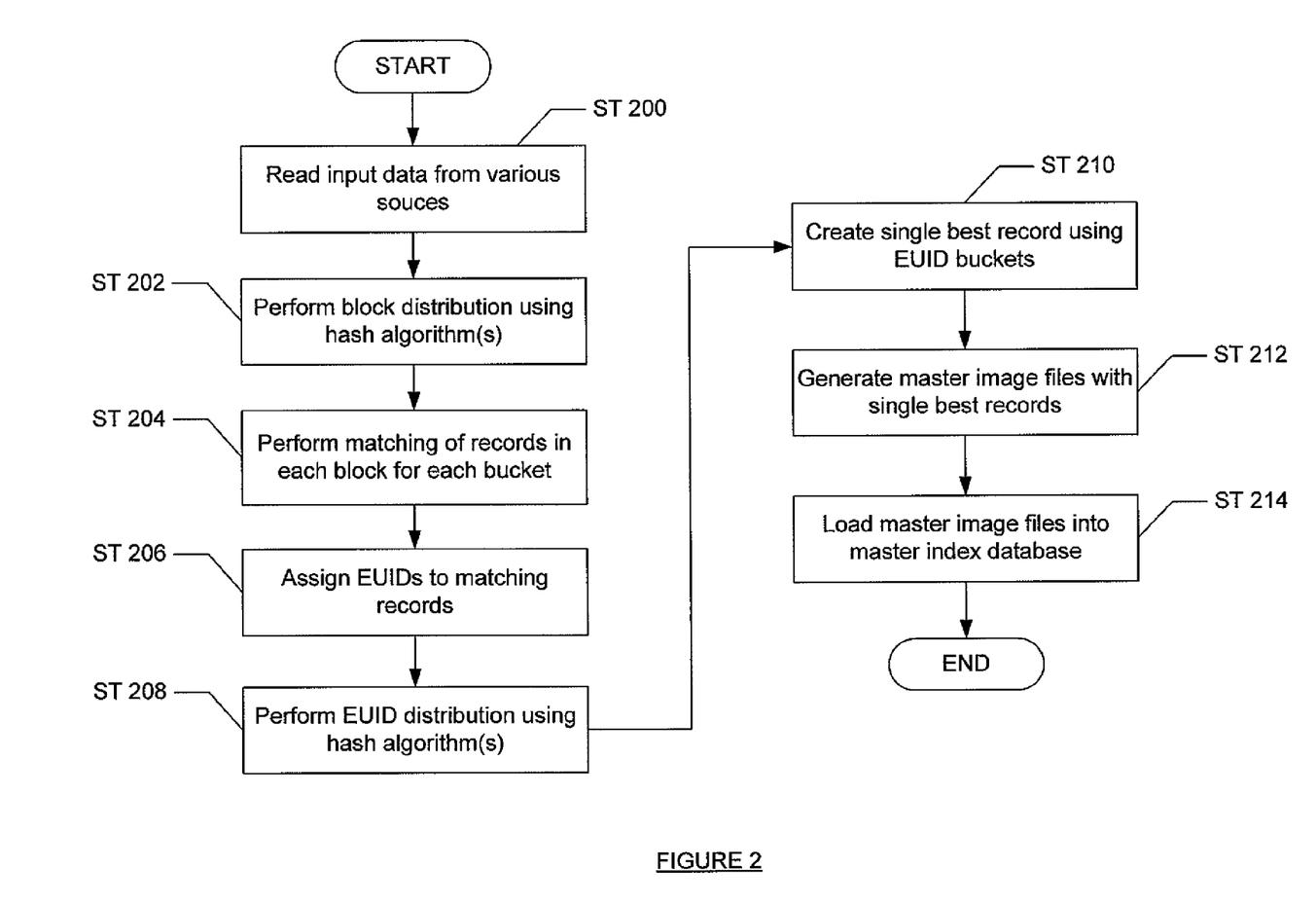
FIG. 2 shows a flow chart in accordance with one or more embodiments of the invention.

FIG. 2 shows a flow chart for performing bulk distributed matching and loading in accordance with one or more embodiments of the invention. In one or more embodiments of the invention, one or more of the steps discussed below may be omitted, repeated, performed concurrently, and/or performed in a different order than the order shown in FIG. 2.

Accordingly, the specific arrangement of steps shown in FIG. 2 should not be construed as limiting the scope of the invention.

Initially, input data is read from one or more sources (ST 200). As described above, input data may be obtained from one or more customer databases, file systems, persistent storage, or any other suitable storage medium on which record data may be stored. In one or more embodiments of the invention, as input data is read, a global identifier (GID) is allocated to each input record. The GID uniquely identifies a record across all systems. The GID may be assigned using sequential positive integers. Alternatively, GIDs may be assigned using any other type of numerical, alphabetical alpha-numerical, and/or character allocation mechanism.

Subsequently, block distribution is performed on the input data (ST 202). In one or more embodiments of the invention, block distribution is performed using one or more types of hashing algorithms. Block distribution involves two steps. First, a block definition is defined to allocate records with one or more common data fields to the same block. The number and categories of common data fields that make up a block definition may be user-defined. Second, each block of records is then allocated to a bucket using a hash algorithm to obtain a hash value of the block of records. As described above, a bucket is a container of one or more blocks. Allocating each block of records to a bucket ensures that one group of records is stored in only one bucket. For example, all "JohnSmith" records are allocated to the same bucket.

Next, distributed matching is performed for each block of records contained in each bucket (ST 204). Distributed matching results in assigning a match weight to each record pair within a block of records, and determining whether the match weight is greater or less than a match threshold weight. The match threshold weight may be a predefined user-selected match weight. In one or more embodiments of the invention, the match threshold weight may be computed using probability and/or statistical algorithms that estimate how similar two records have to be in order to consider the records a match. Those skilled in the art will appreciate that not all records included in a block of records match at least one other record in the block of records. That is, an input record within a block of records may not be a match to any other input record in the block of records. However, the unmatched input record may be a match to an input record included within another block of records.

More specifically, in addition to matching within each block of records in each bucket, performing concurrent matching operations on each block of records also includes matching input records across each block of records, and results in obtaining matched sets of input records. In one embodiment of the invention, each matched set of input records may include input records that are determined to be a match within a particular block of records, and also across one or more blocks of records. Said another way, the matched sets of input records are not limited to being from the same block of records. Thus, matching is performed across block records to determine which input records link to each other and are determined to be part of the same input profile.

Specifically, to match a block of records, every record in the block is matched with every other record in the block. Thus, if the number of records in a block is represented by B, then B*B match operations are performed on each block. Further, as described above, a bucket may include more than one block of record data. Thus, processing a single bucket involves repeating B*B matching operations for each block of data contained within the bucket. Further, after each block of records is matched, the match files created by each concurrently executing computing device are merged into a large match file that is used to obtain the matched sets of input records across one or more block records.

Those skilled in the art will appreciate that matching of block records may be performed using well known fuzzy logic algorithms, such as string matching algorithms (e.g., JARO-Winkler algorithm) or any other suitable matching algorithm known in the art. In one or more embodiments of the invention, the distributed architecture employed by embodiments of the invention allows for a different computing device to pick up one bucket at a time to process (e.g., perform matching functions). Once the current bucket is processed, the computing device picks up the next unassigned bucket. Each computing device that performs matching on a bucket stores the links for matching records in a separate match file.

The aforementioned method for distributed matching allows for a completely dynamic load balancing method of matching among different slave computing devices working in parallel to complete a single task. Those skilled in the art will appreciate that at any given point in time, all slave computing devices are performing the same task. That is, during the distributed matching phase of the bulk distributed matching and loading, all slave computing devices and the master bulk matcher and loader are performing matching. In one or more embodiments of the invention, the next task is commenced only after completion of the current task by all the computing devices.

Continuing with FIG. 2, an EUID is assigned to records that are determined to match each other (ST 206). More specifically, a common enterprise identifier is assigned to input records in a same matched set of input records. To assign EUIDs to matching records, the match files stored by different computing devices during the distributed matching are merged. The merged match file includes both forward and backward match links for each record pair that is determined to be a match. For example, if records 1 and 8 are a match, then the merged match file may include the forward link matching record 1 to record 8, and the backward link matching record 8 to record 1. As described above, the merged match file includes input records that match across blocks of records.

In addition, EUIDs are created and maintained in an EUID index file. In one or more embodiments of the invention, the EUID index file is a random access file used to allocate EUIDs to input data (e.g., records). Initially, the EUID index file is initialized to assign a default EUID (e.g., all zeros) to each input record identified by its GID. For every GIDFrom that appears in the merged match file, the record position of the GIDFrom is noted and set as the position of the GID in the EUID index file. For example, suppose a merged match file, includes, in part, the following entries:

| GIDFrom | GIDTo | weight |
| --- | --- | --- |
| 1 | 8 | 50 |
| 3 | 6 | 60 |
| 6 | 3 | 60 |
| 6 | 8 | 75 |
| 8 | 1 | 50 |
| 8 | 6 | 75 |

The corresponding initialized EUID index file would then read as follows:

| GID | EUID | Position |
| --- | --- | --- |
| 1 | 0000000 | 1 |
| 2 | 0000000 | 0 |
| 3 | 0000000 | 2 |
| 4 | 0000000 | 0 |
| 5 | 0000000 | 0 |
| 6 | 0000000 | 3 |
| 7 | 0000000 | 0 |
| 8 | 0000000 | 4 |

Particularly, the EUID index file is structured so that each EUID of an input record may be found at the corresponding record GID value. In other words, the EUID of GID value 100 may be found at record #100 in the EUID index file. As shown above, the merged match file is read to determine the position of each GIDFrom, and the corresponding position is inserted into the EUID index file. That is, the merged match file and the original input file created by the block distributor are compared to create and populate the EUID file. In this manner, both the merged match file and the EUID index file are used to allocate EUIDs to each record. The total number of records in the EUID index file is equal to the total number of input records and the maximum GID value (assuming the GID value is assigned sequentially). Upon initialization of the EUID index file with default values, each set of records that match are assigned the same EUID value. Those skilled in the art will appreciate that a set of records that match may include more than just a pair of matching records. For example, if record GID 1 matches record GID 3, and record GID 3 matches record GID 6, then record GID 1 also matches to record GID 6, and all three records (1, 3, and 6) are assigned the same EUID value. Thus, in one or more embodiments of the invention, recursive links are found in the merged match file so that the same EUID can be assigned to each matching record. Using the example from above, records with GID 1, 3, 6, and 8 would be assigned the same EUID. A unique EUID is assigned to any GID that does not appear in the merged match file (i.e., an input record that does not have any matching records).

At this stage, the EUID index file is completed with a mapping of GIDs to corresponding EUIDs. Subsequently, EUID distribution is performed (ST 208). Specifically, each EUID value is hashed using a hash algorithm to distribute the EUID values to buckets. Thus, each record that is assigned the same EUID will be allocated to the same EUID bucket. Further, each EUID bucket may include more than one set of EUID values. Next, each EUID bucket is processed (i.e., matched) to create a unified profile, also known as a single best record (ST 210). In one or more embodiments of the invention, the single best record is a compilation of all the records that are assigned the same EUID. In other words, the single best record is the most complete unified profile that matches all the records with the same EUID.

In one or more embodiments of the invention, single best records are stored in master image files (ST 212), which are then loaded into the master index database (ST 214) via a loader. In one or more embodiments of the invention, the master image files may include more than just the single best record entries. For example, the original input records, and the EUID values corresponding to each single best record may also be stored in master image files. Further, as described above, in one or more embodiments of the invention, the master index database is empty before the master image files are loaded.

Although not shown in FIG. 2, embodiments of the invention may create one or more potential duplicate files that are also loaded into the master index database. Potential duplicate files are potentially matched data that may be subsequently resolved as being matched or unmatched by user intervention. The potential duplicate files are created using the same distributing and matching steps described above, but are created using the single best record and the EUID values. In one or more embodiments of the invention, single best records are distributed to different block buckets using a hash algorithm. Upon distribution of all the single best records, concurrent matchers match the single best record block buckets. If the match weight corresponds to a potential duplicate threshold weight, then the single best record is added to a potential duplicate file.

Figure 3:
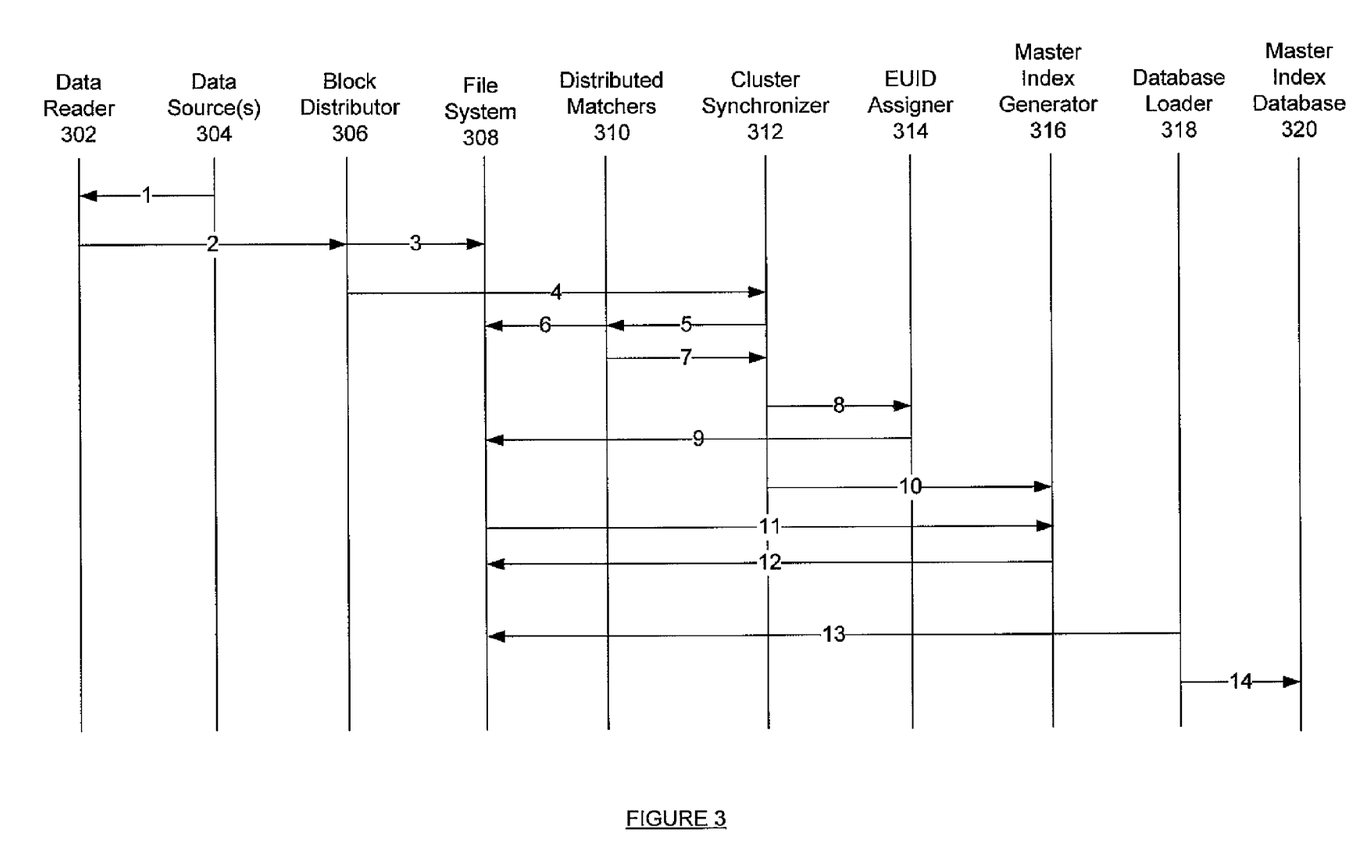
FIG. 3 shows an example flow diagram in accordance with one or more embodiments of the invention.

FIG. 3 shows a flow diagram for bulk distributed matching and loading in accordance with one or more embodiments of the invention. Specifically, FIG. 3 shows a flow diagram showing the steps performed by each of the components of FIG. 1. In one or more embodiments of the invention, one or more of the steps discussed below may be omitted, repeated, and/or performed in a different order than the order shown in FIG. 3. Accordingly, the specific arrangement of steps shown in FIG. 3 should not be construed as limiting the scope of the invention.

Initially, the input data is read by a data reader (302) from the input data source(s) (ST 1). In one or more embodiments of the invention, the data reader (302) generates and assigns each input record a GID value as the input record is read. The block distributor (304) then retrieves the input data and performs block distribution using a hash algorithm to obtain block buckets (ST 2). Further, in one embodiment of the invention, the block distributor (304) also writes a data file including all the GIDs and input records obtained from the data reader (not shown). The distributed blocks are written to a block bucket files in the file system (308) used for intermediate data storage (ST 3). Upon completion of block distribution into buckets, the block distributor (304) informs the cluster synchronizer (312) that the task is complete (ST 4). The cluster synchronizer (312) subsequently initializes the next task (i.e., distributed matching). The distributed matchers (310) obtain the block files from the cluster synchronizer (312) (ST 5) and subsequently perform matching functions to create match files. The match files are also written to the file system (308) by the distributed matchers (310) (ST 6). As described above, performing matching functions on each of the blocks of records includes matching input records across block records to obtain matched sets of input records. The distributed matchers (310) each indicate to the cluster synchronizer (312) that the matching task has been performed (i.e., all the buckets have been processed) (ST 7), and the cluster synchronizer (312) initiates the next task. Those skilled in the art will appreciate that some of the distributed matchers may wait in an idle state while other distributed matchers are completing matching on a current bucket.

At this stage, the EUID Assigner (314) obtains the match file from the cluster synchronizer (312) (ST 8). Those skilled in the art will appreciate that although not shown in FIG. 3, each of the components performing each task may, in addition to obtaining the necessary information from the cluster synchronizer, also access the file system to read the block bucket files, match files, EUID bucket files, EUID index file, and other data stored in the file system, while performing an assigned task. For example, the EUID assigner (314) may read the match files stored by each of the distributed matchers and the original input data file written by the block distributor (304) to assign EUIDs to each set of matching records. More specifically, a common EUID is assigned to input records in a same matched set of input records. Thus, in one or more embodiments of the invention, the EUID assigner (314) merges the match files stored by each of the distributed matchers (310) and assigns a common EUID to those input records that are part of a matched set of input records.

Next, the EUID assigner (314) creates EUID bucket files using a hash algorithm and stores the EUID bucket files into the file system (308) (ST 9). The master index generator (316) obtains permission from the cluster synchronizer (312) to begin the next distributed task of processing the EUID bucket files (ST 10). The master index generator (316) subsequently reads the EUID bucket files from the file system (308) (ST 11) and writes master image files to the file system (308). The master image files include the single best record for each set input records that are assigned a common EUID (ST 12). Finally, the single best records are obtained and read by the database loader (318) from the master image files stored in the file system (308) (ST 13), and subsequently loaded into the master index database (320) (ST 14).

Figure 4:
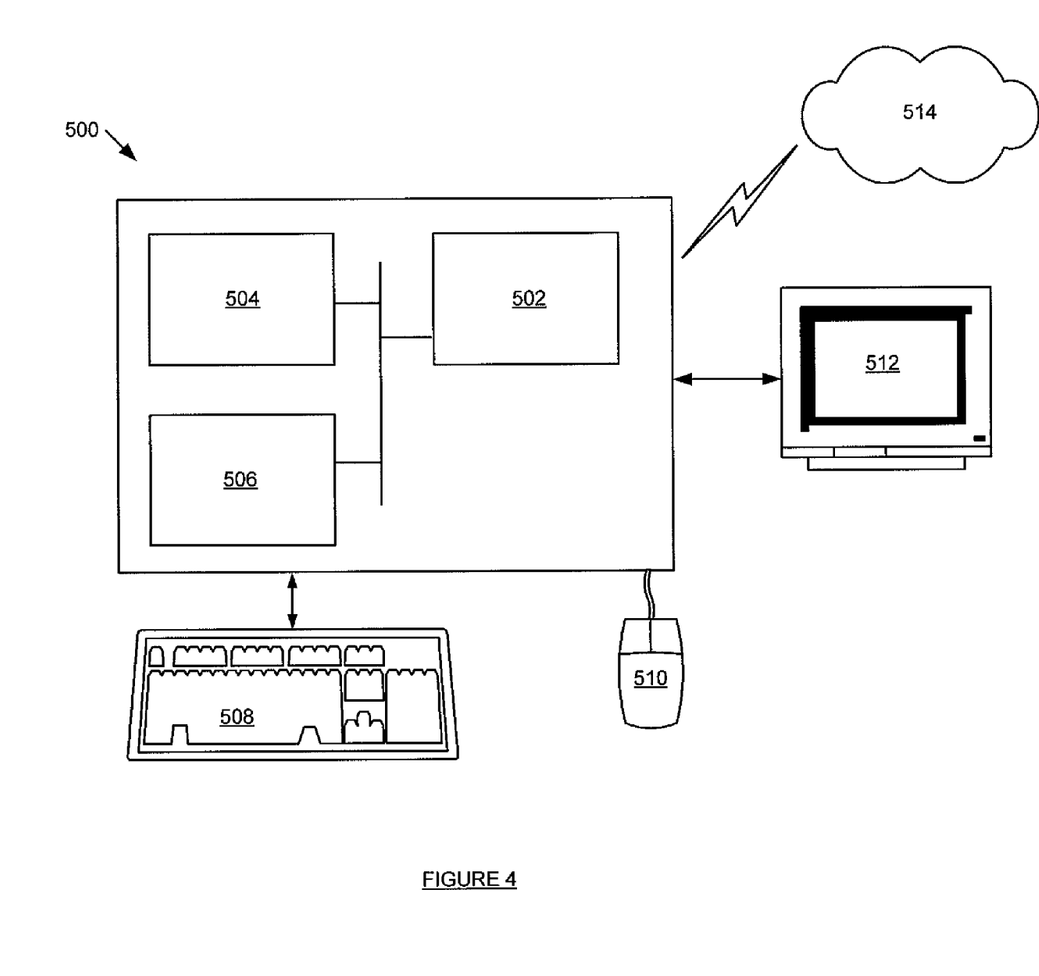
FIG. 4 shows a computer system in accordance with one or more embodiments of the invention.

Embodiments of the invention may be implemented on virtually any type of computing device regardless of the platform being used. For example, as shown in FIG. 4, a computer system (500) includes a processor (502), associated memory (504), a storage device (506), and numerous other elements and functionalities typical of today's computers (not shown). The processor (502) may be a single-core, single-threaded processor, a multi-core, single-threaded processor, a multi-core, multi-threaded processor, a parallel processor, a distributed processor that includes one or more CPUs on different computing devices, or any other suitable type of processor found in computing devices. Further, the memory (504) may be an on-chip or off-chip cache, a shared cache, RAM, ROM, or any other suitable type of memory typically associated with a processor, including forms of memory now known or later developed. The storage device (506) may be any type of suitable storage medium, such as hard disk drives, CDs, tapes, hybrid drives, flash drives, etc. The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (514). Those skilled in the art will appreciate that these input and output means may take other forms, now known or later developed.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., distributed matchers, EUID assigner, master index database, data integrator loader, etc.) may be located on a different node within the distributed system. In one or more embodiments of the invention, the node may be a computer system. In some embodiments of the invention, the node may be a processor with associated physical memory. The node may also be a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide an efficient method for probabilistic matching and loading of volume data into a master index when there is initially no data in the master database. Data to be loaded may be a magnitude of billions of records. Thus, embodiments of the invention employ a distributed architecture to enable concurrent computing devices to work in parallel to perform probabilistic matching functions. Hash algorithms are used to distribute data to different files/buckets to create groups, thereby avoiding any kind of persistent storage sorting in cases where data size is much larger than processor memory size. In addition, embodiments of the invention use sequential file I/O for read/write of data to reduce the time required to match and load bulk data.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for matching bulk data, comprising:
receiving a plurality of input records;
performing block distribution on the plurality of input records to obtain a plurality of block records, wherein performing block distribution comprises distributing the plurality of input records to a first plurality of containers;
performing concurrent matching operations on the plurality of block records to obtain a plurality of single best records,
wherein performing concurrent matching operations on the plurality of block records comprises matching block records in each container of the first plurality of containers by:
determining a match threshold weight;
comparing a match weight for a pair of input records in one of the plurality of block records to the match threshold weight; and
determining the pair of input records to be a match when the match weight of the pair of input records is not less than the match threshold weight,
wherein the matched pair of input records is used to obtain one of the plurality of single best records, wherein each of the plurality of single best records comprises a unified profile of data compiled from a matched set of input records; and
loading the plurality of single best records into a master index database.

2. The method of claim 1, wherein distributing the plurality of input records to the first plurality of containers comprises hashing at least one common field in each block record of the plurality of block records to distribute the plurality of block records into the first plurality of containers.

3. The method of claim 1, wherein a first container of the first plurality of containers is matched by a first concurrently executing computing device and a second container is matched by a second concurrently executing computing device.

4. The method of claim 3, wherein intermediate data created by the first and second concurrently executing computing devices is stored in a file system prior to loading the master index database.

5. The method of claim 1, wherein performing concurrent matching operations on the plurality of block records further comprises:
assigning an enterprise identifier to each input record, wherein a common enterprise identifier is assigned to input records in a same matched set of input records;
hashing each common enterprise identifier to distribute the input records associated with the common enterprise identifier to a second plurality of containers; and
merging the input records in each container of the second plurality of containers to obtain the plurality of single best records, wherein a first container of the second plurality of containers is merged by the first concurrently executing computing device and a second container of the second plurality of containers is merged by the second concurrently executing computing device.

6. The method of claim 5, wherein assigning the enterprise identifier to each input record, comprises:
creating a merged match file comprising the plurality of matched sets of input records;
creating an index file, wherein the index file comprises a mapping of each input record to a corresponding position of the input record in the merged match file; and
assigning the enterprise identifier using the merged match file and the index file.

7. The method of claim 1, wherein each block record of the plurality of block records comprises a plurality of input records with at least one common data field.

8. A system for matching bulk data, comprising:
a master computing device configured to:
receive a plurality of input records, and
perform block distribution on the plurality of input records to obtain a plurality of block records, wherein performing block distribution comprises distributing the plurality of input records to a first plurality of containers;
a plurality of slave computing devices configured to execute concurrently to:
match the plurality of block records to obtain a plurality of single best records by:
matching block records in each container of the first plurality of containers to obtain a plurality of matched sets of input records by:
determining a match threshold weight;
comparing a match weight for a pair of input records in one of the plurality of block records to the match threshold weight; and
determining the pair of input records to be a match when the match weight of the pair of input records is not less than the match threshold weight,
wherein the matched pair of input records is used to obtain one of the plurality of single best records, wherein each of the plurality of single best records comprises a unified profile of data compiled from a matched set of input records; and
a master index database configured to store the plurality of single best records.

9. The system of claim 8, wherein
the master computing device is further configured to:
hash at least one common field in each block record of the plurality of block records to distribute the plurality of block records into the first plurality of containers.

10. The system of claim 8, wherein
the master computing device is further configured to:
assign an enterprise identifier to each input record, wherein a common enterprise identifier is assigned to input records in a same matched set of input records; and
hash each common enterprise identifier to distribute the input records associated with the common enterprise identifier to a second plurality of containers; and
the plurality of slave computing devices is further configured to execute concurrently to:
merge input records in each container of the second plurality of containers to obtain the plurality of single best records, wherein a first container of the second plurality of containers is merged by a first slave computing device and a second container of the second plurality of containers is merged by a second slave computing device.

11. The system of claim 8, wherein the plurality of block records comprise a plurality of input records with at least one common data field.

12. The system of claim 8, further comprising:
a cluster synchronizer configured to coordinate tasks performed by the master computing device and the plurality of slave computing devices; and
a file system configured to intermediately store data created by the master computing device and the plurality of slave computing devices prior to loading of the master index database, wherein the master index database is initially empty.

13. The system of claim 8, further comprising:
a loader configured to load the plurality of single best records into the master index database, wherein the loader is a database bulk loading tool.

14. The system of claim 8, wherein the plurality of input records are received from a plurality of sources, and wherein the plurality of sources comprise at least one selected from a group consisting of a database, a file system, and a persistent storage medium.

15. A computer readable medium comprising instructions for matching bulk data, the instructions comprising functionality to:
receive a plurality of input records;
perform block distribution on the plurality of input records to obtain a plurality of block records, wherein performing block distribution comprises distributing the plurality of input records to a first plurality of containers;
perform concurrent matching operations on the plurality of block records to obtain a plurality of single best records, wherein performing concurrent matching operations on the plurality of block records comprises matching block records in each container of the first plurality of containers by:
  determining a match threshold weight;
  comparing a match weight for a pair of input records in one of the plurality of block records to the match threshold weight; and
  determining the pair of input records to be a match when the match weight of the pair of input records is not less than the match threshold weight,
wherein the matched pair of input records is used to obtain one of the plurality of single best records, wherein each of the plurality of single best records comprises a unified profile of data compiled from a matched set of input records; and
load the plurality of single best records into a master index database.

16. The computer readable medium of claim 15, wherein the instructions for distributing the plurality of input records to a first plurality of containers comprise functionality to:
hash at least one common field in each block record of the plurality of block records to distribute the plurality of block records into the first plurality of containers.

17. The computer readable medium of claim 15, wherein the instructions for performing concurrent matching operations on the plurality of block records further comprise functionality to:
match block records in each container of the first plurality of containers to obtain a plurality of matched sets of input records, wherein a first container of the first plurality of containers is matched by a first concurrently executing computing device and a second container of the first plurality of containers is matched by a second concurrently executing computing device;
assign an enterprise identifier to each input record, wherein a common enterprise identifier is assigned to input records in a same matched set of input records;
hash each common enterprise identifier to distribute the input records associated with the common enterprise identifier to a second plurality of containers; and
merge the input records in each container of the second plurality of containers to obtain the plurality of single best records, wherein a first container of the second plurality of containers is merged by a first concurrently executing computing device and a second container of the second plurality of containers is merged by a second concurrently executing computing device.

* * * * *

UNITED STATES PATENT AND TRADEMARK OFFICE
CERTIFICATE OF CORRECTION

| | | |
|---|---|---|
| PATENT NO. | : 8,943,057 B2 | Page 1 of 1 |
| APPLICATION NO. | : 11/955219 | |
| DATED | : January 27, 2015 | |
| INVENTOR(S) | : Dua | |

It is certified that error appears in the above-identified patent and that said Letters Patent is hereby corrected as shown below:

In the Drawings;

On sheet 2 of 4, in figure 2, under Reference Numeral ST200, line 2, delete "souces" and insert -- sources --, therefor.

In the Specification;

In column 1, line 31, delete "Angles" and insert -- Angeles --, therefor.

In column 3, line 38, delete "martial" and insert -- marital --, therefor.

In column 6, line 13, delete "alphabetical" and insert -- alphabetical, --, therefor.

Signed and Sealed this
Seventeenth Day of November, 2015

Michelle K. Lee
*Director of the United States Patent and Trademark Office*